(12) United States Patent
Wepman et al.

(10) Patent No.: US 10,331,156 B2
(45) Date of Patent: Jun. 25, 2019

(54) SYSTEM AND METHOD FOR BIG DATA GEOGRAPHIC INFORMATION SYSTEM DISCOVERY

(71) Applicant: Leidos, Inc., Reston, VA (US)

(72) Inventors: Joshua Anders Wepman, Ann Arbor, MI (US); Jonathan D. Michel, Charlottesville, VA (US); Timothy Leigh Crowell, New Orleans, LA (US); Matthew William Vahlberg, Severna Park, MD (US)

(73) Assignee: Leidos, Inc., Reston, VA (US)

( * ) Notice: Subject to any disclaimer, the term of this patent is extended or adjusted under 35 U.S.C. 154(b) by 635 days.

(21) Appl. No.: 15/058,385

(22) Filed: Mar. 2, 2016

(65) Prior Publication Data

US 2016/0259357 A1   Sep. 8, 2016

Related U.S. Application Data

(60) Provisional application No. 62/127,371, filed on Mar. 3, 2015.

(51) Int. Cl.
*G05F 1/66* (2006.01)
*G05B 15/02* (2006.01)
*G06F 16/29* (2019.01)

(52) U.S. Cl.
CPC ............ *G05F 1/66* (2013.01); *G05B 15/02* (2013.01); *G06F 16/29* (2019.01)

(58) Field of Classification Search
CPC ..... G05F 1/66; G05B 15/02; G06F 17/30241; G06Q 50/06; G01R 21/00; G01R 11/00
(Continued)

(56) References Cited

U.S. PATENT DOCUMENTS 8,462,014 B1 * 6/2013 Kardos ............. H02J 13/001
340/870.02
8,712,711 B2 * 4/2014 Nayar .................. H02J 3/26
324/66
(Continued)

OTHER PUBLICATIONS

Juliet Popper Shaffer, "Multiple Hypothesis Testing," Annual Review of Psychology, 46, 1995, pp. 561-584.
(Continued)

*Primary Examiner* — Gene N Auduong
(74) *Attorney, Agent, or Firm* — Dawn-Marie Bey; Bey & Cotropia PLLC

(57) ABSTRACT

A system and method for learning and asserting what portions of a utility GIS network model are incorrect or flawed as they relate to real world conditions, and what the correct real world relationships are in the field is described. The system and method leverage available smart grid data to assess the quality of a primary (GIS) source data set; quality data renders derived analyzes across the utility valid, sound, and action worthy. The system and method utilize existing partially correct electrical network distribution model data and various non-specialized source data including smart meter, spatial, and customer information data collected from the network to test, validate and suggest corrections to the connectivity model. By forming putative ground truth assignments between utility components, the system tests the assumptions by examining the geospatial proximity and correlating voltage and event data over time to form refined hypothesis. These hypotheses are compared to the existing model and statistical tests are performed at a variety of confidence levels to propose a corrected network model to the user.

18 Claims, 11 Drawing Sheets

(58) Field of Classification Search
USPC .............................. 700/291, 296; 702/60, 62
See application file for complete search history.

(56) References Cited

U.S. PATENT DOCUMENTS

| | | | |
|---|---|---|---|
| 9,092,502 B1 | 7/2015 | Cannaliato et al. | ........................ |
| | | | G06F 17/30595 |
| 9,103,854 B2 * | 8/2015 | Kardos | ................. H02J 13/001 |
| 9,910,102 B2 * | 3/2018 | Stoupis | ................. G01R 31/40 |
| 10,001,514 B2 * | 6/2018 | Bernheim | ............ G01R 22/066 |
| 2013/0178998 A1 * | 7/2013 | Gadiraju | ................ G06Q 50/06 |
| | | | 700/296 |
| 2015/0241482 A1 | 8/2015 | Sonderegger | |

OTHER PUBLICATIONS

Samual S. Blackman, "Multiple Hypothesis Tracking for Multiple Target Tracking," IEEE A&E Systems Magazine, vol. 19, No. 1, Part 2: Tutorials, Jan. 2004, 14 pp.

* cited by examiner

Figure 1 – Prior Art

SYSTEM AND METHOD FOR BIG DATA GEOGRAPHIC INFORMATION SYSTEM DISCOVERY

CROSS-REFERENCE TO RELATED APPLICATIONS

The present application claims the benefit of priority to U.S. Provisional Patent Application No. 62/127,371 filed Mar. 3, 2015 which is incorporated herein by reference in its entirety.

BACKGROUND

Field of the Invention

The embodiments are generally related to electricity outage management and more particularly to methods and systems for automated mapping of meters to transformer to substation with a high degree of certainty.

Description of the Related Art

Major electric utilities are working hard to improve outage management and reliability. One of the major investments they are making is in outage management systems which help identify and isolate outages. The major issue with these systems is the quality of source data, particularly their engineering model. What assets connect to each other is a major dependency for these investments to pay off, and big utilities have major errors in their connectivity models, creating "garbage-in, garbage-out" situations. That is, while smart meter and SCADA station data can be measured and are largely quantifiably accurate, the relational model that connects that data according to the electric delivery infrastructure in the field is inaccurate. More specifically, there is currently no automated (non-manual) process for mapping, with a high degree of certainty, an individual smart meter to the physical transformer to which it is connected and to which substation and phase that physical transformer is connected. This has led to an erosion of the value major utility digital investments can provide. Utilities are in need of a way to correct their connectivity models, and the process of "walking the lines" on thousands of circuits and millions of customers is economically unfeasable. There needs to be a data science way to discover errors and assert the "right" topology so that outage management system ("OMS") investments can truly pay off.

A solution to this problem is difficult, it will take a clear understanding of electric infrastructure, energy dynamics, data integration, and data science to interpret numerous data relationships and identify errors in existing models. However, the company which can demonstrate this capability effectively will have solved an urgent problem in need of resolution at a wide range of utilities, which have few other alternatives to resolution. Multiple major investor-owned utilities have communicated this, and it can be seen in other market segments as well.

SUMMARY OF THE EMBODIMENTS

In a first embodiment, a process for assessing the correctness of utility component mapping relationships includes: receiving at a first server a first data set indicative of a first mapping of grid components for a predetermined geographical area, the first data set being from a first source; enriching by an enrichment component running on a server the first data set to include additional details related to the grid components within the predetermined geographical area to produce a second data set indicative of a second mapping of the grid component for the predetermine geographical area, the additional details being from one or more additional sources; analyzing by an analytical component running on a server the first mapping of grid components and the second mapping of grid components for the predetermined geographical area to determine a validity of each individual mapping between two or more grid components in the first mapping and storing results of the determined validity in at least one storage component; and providing by an output component with access to the at least one storage component an indicator of the determined validity of each individual mapping between two or more grid components in the first mapping.

In a second embodiment, a system for assessing the correctness of utility component mapping relationships includes: a first subsystem including at least a first database for receiving a first data set indicative of a first mapping of grid components for a predetermined geographical area, the first data set being from a first source; the first subsystem further including an enrichment component running on a processor for enriching the first data set to include additional details related to the grid components within the predetermined geographical area to produce a second data set indicative of a second mapping of the grid component for the predetermine geographical area, the additional details being from one or more additional sources and a second database for storing the second data set; a second subsystem including an analytical component running on a processor for analyzing the first mapping of grid components and the second mapping of grid components for the predetermined geographical area to determine a validity of each individual mapping between two or more grid components in the first mapping and storing results of the determined validity in at least one storage component; and an output component with access to the at least one storage component for providing an indicator of the determined validity of each individual mapping between two or more grid components in the first mapping.

BRIEF SUMMARY OF THE FIGURES

The following Detailed Description, is best understood when read in conjunction with the following exemplary drawings.

DETAILED DESCRIPTION

The following abbreviations and acronyms are referenced herein:

---

AMI—Advanced Metering Infrastructure
ADW—Analytics Data Warehouse
CAP—Cloud Analytics Platform
CIS—Customer Information System
DE—Digital Edge
ECEF—Earth-Centered, Earth-Fixed
ESP—Energy Service Provider
ETL—Extract, Transform, Load
FME—Feature Manipulation Engine
FTP/sFTP—File Transfer Protocol/secure File Transfer Protocol
GIS—Geographic Information System
HDFS—Hadoop Distributed File System
MDM—Meter Data Management
MHT—Multi-Hypothesis Tracking
PCC—Point of Common Control
RDBMS—Relational Database Management System
ROC—Receiver Operating Characteristic
SCADA—Supervisory Control And Data Acquisition
TLA—Top Level Aggregator

---

The present embodiments are directed to a system and method to leverage commonly available utility Smart Grid sensor data to assert the correct relationships in the distribution Geographic Information System (GIS) model, allowing for corrected data, optimized outage management processes, quantifiable analytical systems, and improved bottom line utility performance.

Figure 1:
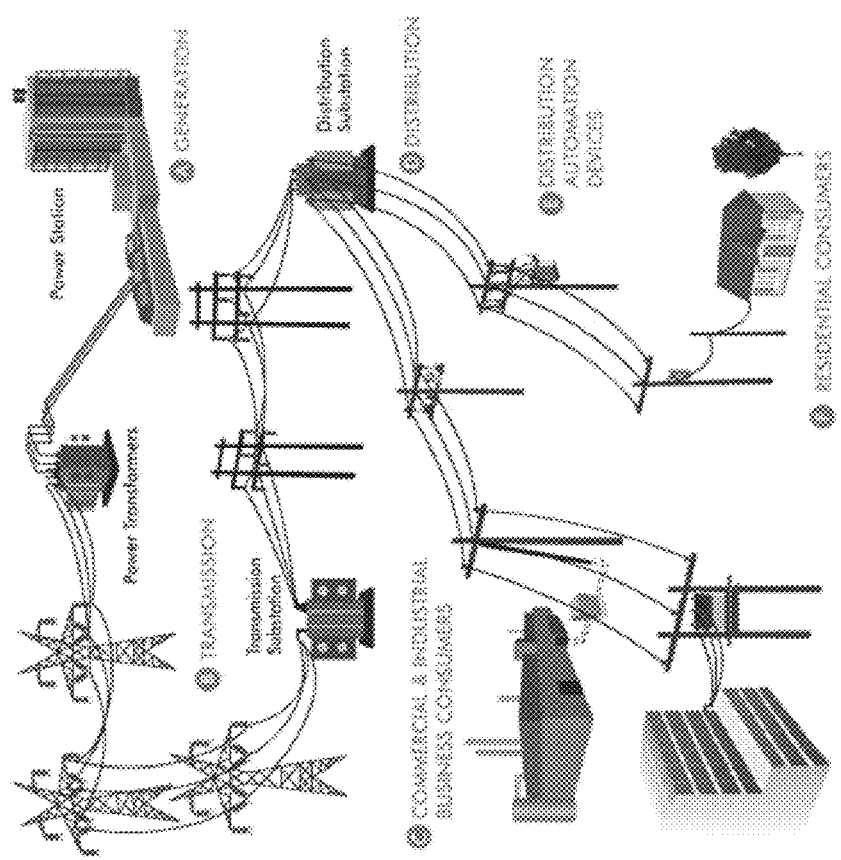
FIG. 1 represents an exemplary prior art U.S. utility grid model.

More particularly, the embodiments describe a system and method for learning and asserting what portions of a utility GIS network model are incorrect or flawed as they relate to real world conditions, and what the correct real world relationships are in the field. This method leverages commonly available smart grid data and does not require specialized non-standard data sources or field instrumentation at prohibitive costs. FIG. 1 represents an exemplary prior art U.S. utility grid model. The ultimate value of these methods is to assess the quality of a primary (GIS) source data set that cannot reasonably be manually surveyed at an economically viable cost. The effect of quality data will render derived analyses across the utility valid, sound, and action worthy, and return greater benefits. The system utilizes the existing partially correct electrical network distribution model and a sample of various non-specialized source data including smart meter, spatial, and customer information data collected from the network to test, validate and suggest corrections to the connectivity model. By forming putative ground truth assignments between meters and transformers, transformers and phase, phase and circuit, the system tests the assumptions by examining the geospatial proximity and correlating voltage and event data over time to form refined hypothesis. These hypotheses are compared to the existing model and statistical tests are performed at a variety of confidence levels to propose a corrected network model to the user. Key features of the embodiments include:

1. A novel correlation approach to test the meter to meter voltage data.

2. A novel algorithmic approach for testing the electrical network. By using the strength of correlation of meters to other meters the process is able to detect the connectivity model, at a meter to transformer level, a transformer to phase level and a phase to circuit level.

3. Display of the existing GIS network map and the proposed corrections of the network to a user.

The embodiments described herein may be implemented and used by, e.g., utility providers, to correct and certify a major dimension of input data so the derived conditions and actions can be actioned in good faith. Specific uses of quality confirmed data include: outage-management system accuracy improvements, system planning improvements, capital and asset efficiency improvements, and overall reliability statistic improvements.

In a specific embodiment, the processes described herein may be implemented as a software service subscription (SaaS) where a cloud-based (or, alternatively, on-site client appliance) platform automatically loads common data, performs the analysis described herein, and produces high quality data corrections that ultimately can be loaded into the client source system (GIS). The GIS would then be the corrected single source of truth. The software service would run at regular intervals to ensure ongoing GIS network model data quality.

Figure 2:
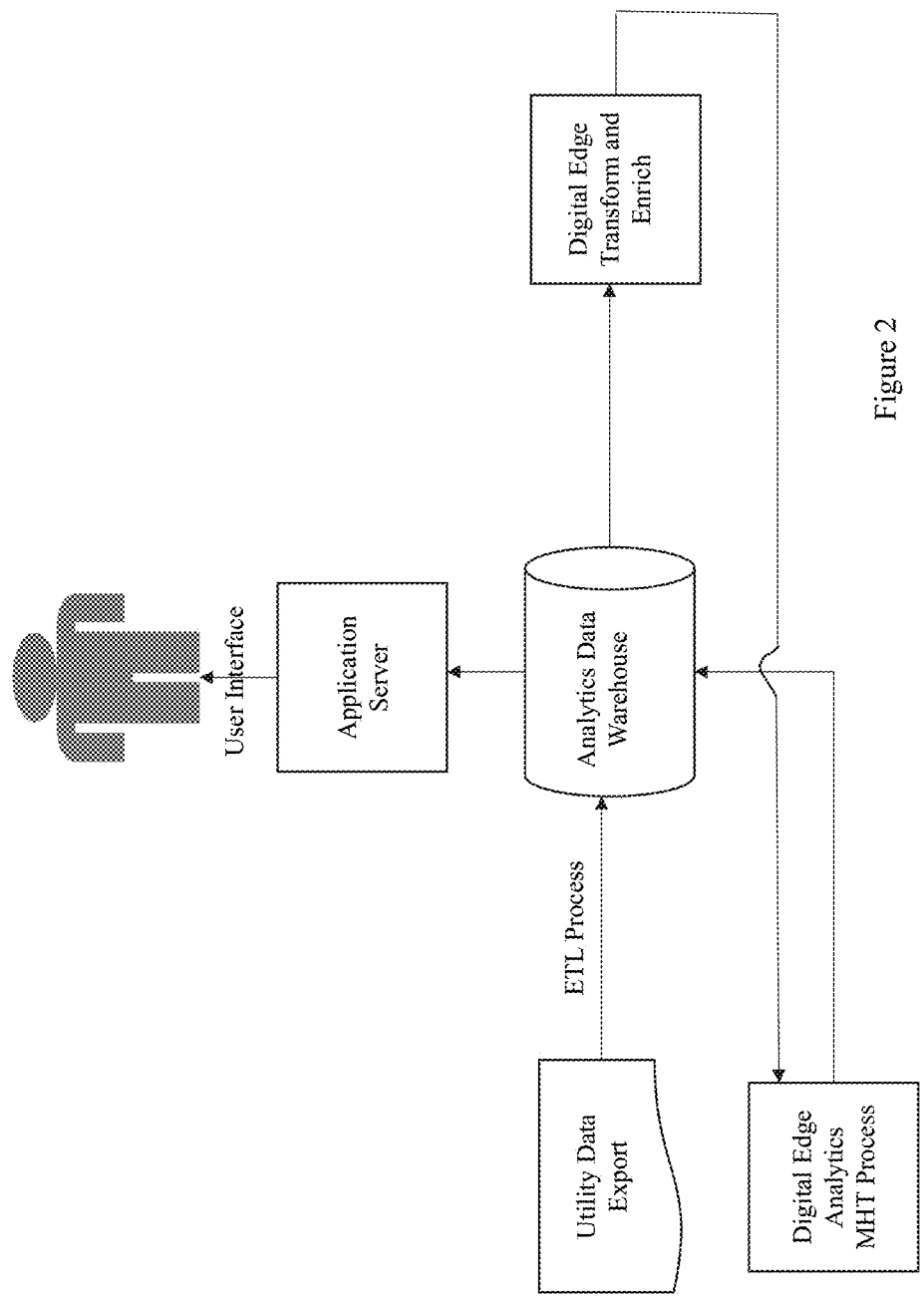
FIG. 2 sets forth the high level process solution steps in accordance with the embodiments described herein.

The steps shown generally in FIG. 2 and discussed below, set forth the process solution in accordance with the embodiments at a high level. A detailed outline of a GIS discovery end-to-end process in accordance with embodiments herein is set forth below and portions are described in detail with respect to various Figures. In the detailed outline, client is not intended to be limited in to any particular source or relationship, but instead refers to the source or sources of the utility data utilized in the GIS discovery process. The various subprocesses identified and described below are implemented through specially programmed hardware, examples of which are provided in FIG. 6 to FIG. 9.

---

1.0 Business and Operational Process (superset)
  1.1 Client Data Integration
    1.1.1 Client Data Discovery and Mapping
      1.1.1.1 Identifies available data and maps to analytics system inputs
        1.1.1.1.1    AMI/MDM
        1.1.1.1.2    GIS
        1.1.1.1.3    SCADA
        1.1.1.1.4    CIS
        1.1.1.1.5    Others
    1.1.2 Data Privacy Constraints
      1.1.2.1 Can the utility or ESP share data externally to leverage cloud economics?
        1.1.2.1.1    Yes - Cloud Service
        1.1.2.1.2    No - Local Appliance -continued 1.1.3 Data Transport Scale Constraints
    1.1.3.1 Can the amount of data required reasonably be transported to the cloud?
        1.1.3.1.1 Yes - Cloud Service
        1.1.3.1.2 No - Local Appliance
1.1.4 Client Data Export
    1.1.4.1 Data is exported from existing enterprise applications in standard or ad-hoc formats
1.1.5 Client Data Transport
    1.1.5.1 Data is transported to GIS Discovery target system (local or cloud)

Figure 5A:
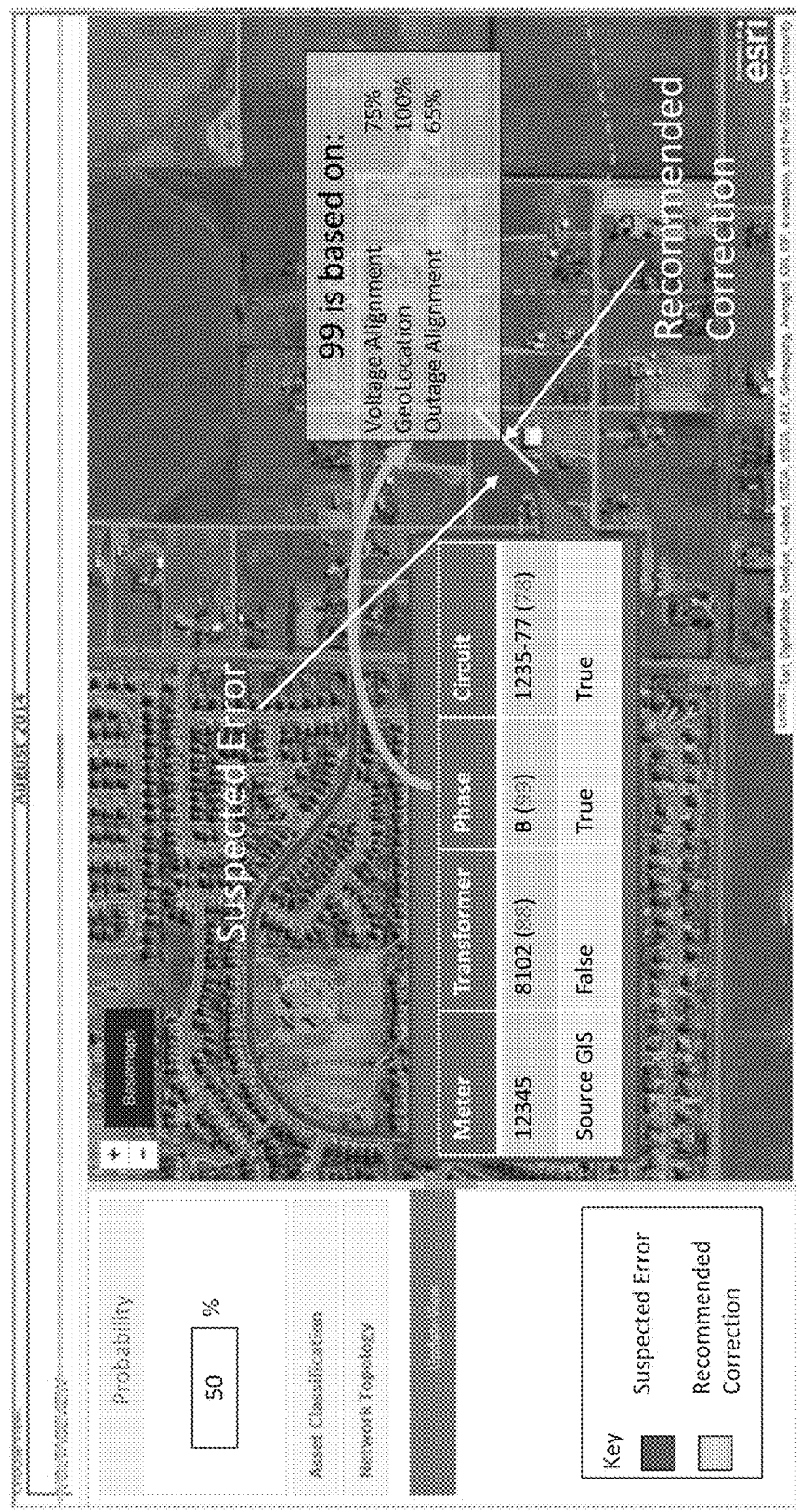
FIGS. 5a-5c are exemplary output views of the requested distribution network model including any inaccuracies identified by the analytics algorithms during processing in accordance with the embodiments described herein.
Figure 5B:
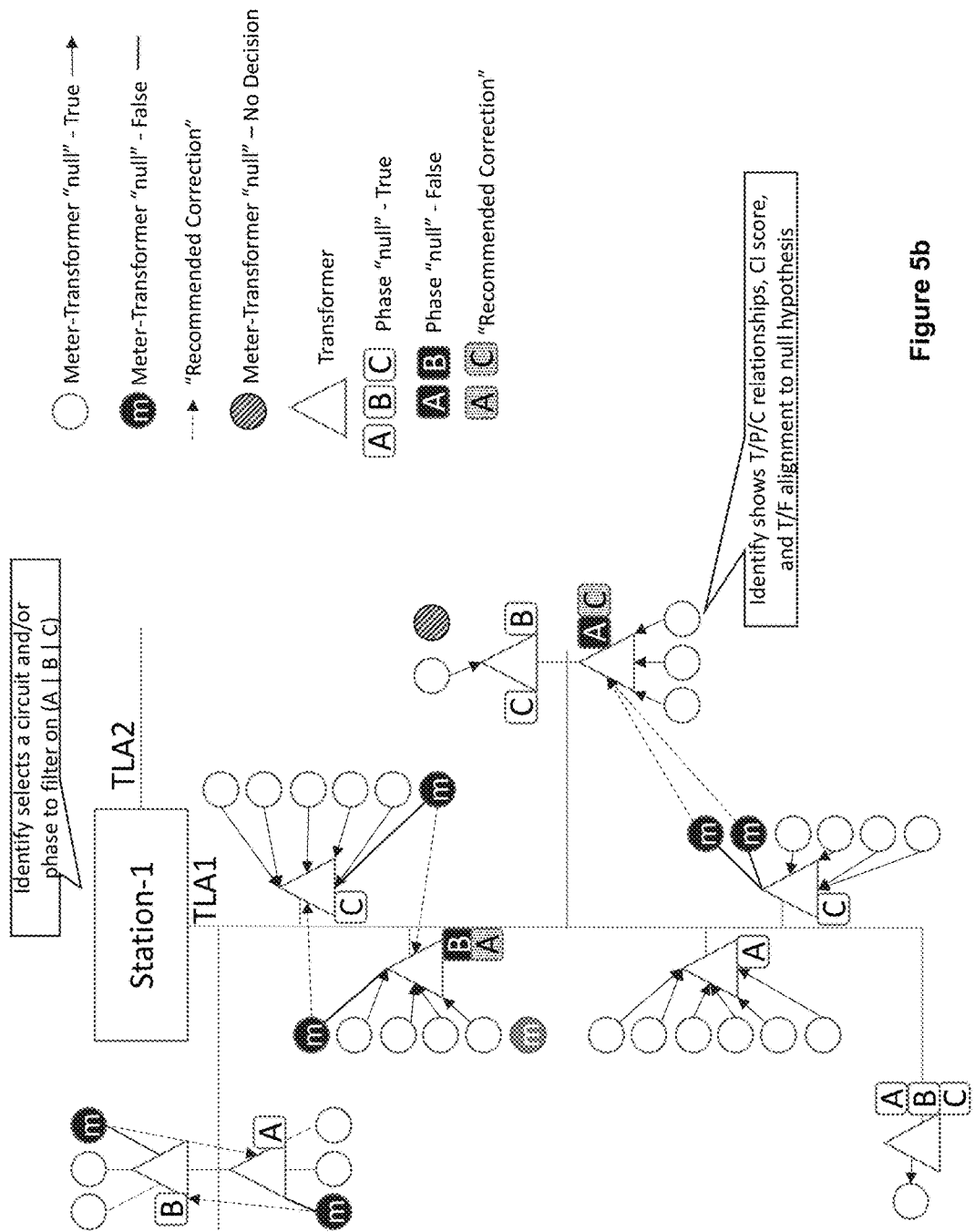
Figure 5C:
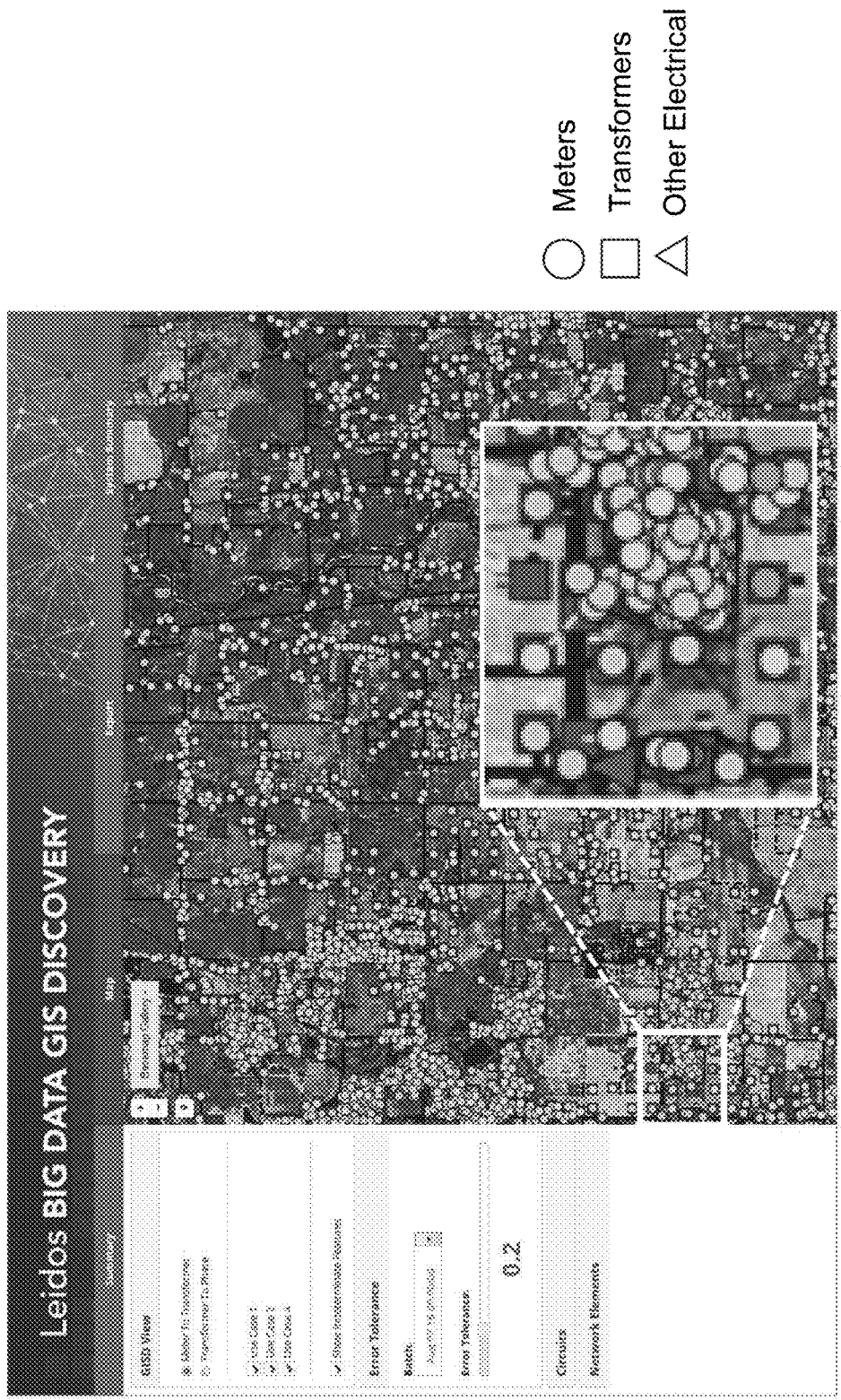

1.2 GIS Discovery Analytical Process
    1.2.1 Described Separately in section-2 outline 1.3 GIS Discovery System Execution and Test
    1.3.1 Adapt analytical methods to fidelity and details of utility collected data
        1.3.1.1 SCADA and AMI variability
        1.3.1.2 GIS as-is state
            1.3.1.2.1 Partial-detail, low-trust
            1.3.1.2.2 Partial-detail, high-trust
            1.3.1.2.3 Full-detail, low-trust
            1.3.1.2.4 Full-detail, high-trust
    1.3.2 Execute system for N weeks depending on quality and quantity of required source data
        1.3.2.1 Analyze as you collect model
        1.3.2.2 Analyze repository and as you collect model
    1.3.3 Monitor ROC Curves to establish benchmarks for performance
    1.3.4 Refine method adjustments
    1.3.5 Commission system based on ROC scores and confidence score baselines 1.4 Results Evaluation and System Action
    1.4.1 GIS Discovery Application training
        1.4.1.1 By Leidos
    1.4.2 Launch Application
    1.4.3 Review score trends over time in summary view to understand the context of the details
        1.4.3.1 High scores and firm conclusions
        1.4.3.2 Varying scores due to system and data change
    1.4.4 Launch Map-Screen (as illustrated in FIG. 5c)
        1.4.4.1 Select from a set of available hypotheses that have been evaluated based on at-scale data science
            1.4.4.1.1 Meter-to-Transformer
            1.4.4.1.2 Transformer-to-Phase
            1.4.4.1.3 Meter-to-Phase
            1.4.4.1.4 Meter-to-Circuit
            1.4.4.1.5 Transformer-to-Circuit
        1.4.4.2 Select use cases that align to user interest:
            1.4.4.2.1 Use case 1 - view map truth and validated connectivity (e.g., shown as certain color circles on screen in FIG. 5c)
            1.4.4.2.2 Use case 2 - view map errors independent of corrective action availability (e.g., shown as certain color circles on screen in FIG. 5c)
            1.4.4.2.3 Use case 4 - view map errors with corrective alternatives identified (e.g., shown as certain color circles on screen in FIG. 5c)
            1.4.4.2.4 Option to view indeterminate (unresolved analysis meters) (e.g., shown as certain color circles on screen in FIG. 5c)
        1.4.4.3 Select Batch
            1.4.4.3.1 A batch refers to a specific data run or defined input set that can be differentiated from a different batch or input set that may drive different analytical results
        1.4.4.4 Select a user-defined error tolerance that aligns certainty of analysis to user perspective and value stream
            1.4.4.4.1 User Tolerance selector is user defined as an input to ROC curve analysis
        1.4.4.5 Select Circuits
            1.4.4.5.1 Circuit selection allows users to reduce the data set to specific electrical station, circuit, feeder, or other GIS attribute definitions as needed to drive user value.
        1.4.4.6 Select Network Elements
            1.4.4.6.1 Enables map layers to reflect user needs.

- 1.4.5 Export selected "deltas"
    - 1.4.5.1 Options may include:
        - 1.4.5.1.1 Not everything, but everything above a certain threshold
        - 1.4.5.1.2 Everything "except this one" field
        - 1.4.5.1.3 Client specific GIS system export
- 1.5 Field Sample
    - 1.5.1 Apply Targeted field resources to go test certain predictions to verify accuracy
    - 1.5.2 Sample set considers positive, negative, and ambiguous predictions.
    - 1.5.3 Leverage truth data to refine ROC curves and incrementally improve accuracy
- 2.0 GIS Discovery Analytical Process
- 2.1 Stage-0: Data Access
    - 2.1.1 Export data from the client system to the cloud-based platform. The cloud can be either secure private or secure public.
    - 2.1.2 Data is loaded via FTP/sFTP (or other methods) to a file transfer application hosted within the solution (cloud or appliance) and placed in, e.g., the Amazon Web Services (AWS) S3 or local storage
    - 2.1.3 Data is loaded into three data storage buckets:
        - 2.1.3.1 Channel (Interval) Data
        - 2.1.3.2 Event Data
        - 2.1.3.3 GIS Data
    - 2.1.4 FME or other utilities may be required to translate import data
- 2.2 Stage-1: GIS Data Loading and Pre-Processing
    - 2.2.1 Goal is to load:
        - 2.2.1.1 Population of Stage-2 enrichments and analytics preparation
            - 2.2.1.1.1 GIS information into a spatial data processing database in order to use it in various places in the future (enrichment)
        - 2.2.1.2 Pull GIS data from the database to Postgres/ADW for downstream application
- 2.3 Stage-2: Base Data Enrichment and Base Analytics
    - 2.3.1 Enrich and execute basic analytical methods, then write to the analytics workspaces as staging for advanced analytics processing
    - 2.3.2 Data is written to a set of analytical workspaces in the HDFS cluster where it is enriched for individual analytical purposes. Specific enrichments vary but already include:
        - 2.3.2.1 Moving Average Filters
        - 2.3.2.2 Geospatial Distance
        - 2.3.2.3 Channel Separation
        - 2.3.2.4 Missing value imputation and data cleaning
        - 2.3.2.5 Others as needed
    - 2.3.3 Data is run through base analysis methods, based on each workspace, used to reduce problem set size and prepare data for at-scale analytics through concatenation and method-specific data models
        - 2.3.3.1 Customer specific adaptation of methods is applied as needed
    - 2.3.4 Data and base analytical metadata are then loaded into the at-scale analytics platform (HDFS) workspaces.
    - 2.3.5 Stage-2 accommodates provisioning the system resources based on the size of the input data.
        - 2.3.5.1 DE does this job, and can be manually changed when needed.
        - 2.3.5.2 DE sets up the environment and kicks off the at-scale analytic manager
- 2.4 Stage-3: At-Scale analytical method application
    - 2.4.1 Execute analytical algorithms at-scale that allows us to assert conclusions about network relationships.
    - 2.4.2 Initially, prepared data is run through several different specified and tuned analytical methods, and meta-data and conclusions/scores are created for network relationships
        - 2.4.2.1 Specific methods include but are not limited to: PCC voltage comparison in n'sets, GIS Kmeans, and others as necessary
        - 2.4.2.2 Customer specific adaptation of methods is applied to some parameters of the analytics job based upon availability of data, customer input, or identified specific data points.
        - 2.4.2.3 Results specific to each analytic job are written into HDFS -continued 2.4.3 Next, a process called a "decisionizer" evaluates at-scale analytical results to determine what appropriate relationships may be.
    2.4.3.1 A series of threads are started to:
        2.4.3.1.1 Convert the results from each at-scale analytics process to independent random variables in a $\chi^2$ distribution (a positive number) and organize them into a matrix, indexed by their source relationship implemented in software that is specific to the analytics task. These matrices of independent variables form the basis of an indicator framework.
    2.4.3.2 Each implemented network relationship is designed to:
        2.4.3.2.1 Accept a subset of available $\chi^2$ indicators from the framework that are relevant to the relationship.
        2.4.3.2.2 Sum the independent variables that correspond to the same source relationship mathematically using the applicable additivity property of independent $\chi^2$ variables.
        2.4.3.2.3 For several levels of confidence, perform $\chi^2$ tests that will compare each child device with all other child devices under the parent device and decide by majority vote if the given child device "belongs" with the other devices.
        2.4.3.2.4 A single value is produced that represents the confidence level at which a given network relationship between a parent and each child network relationship is established with confidence.
2.4.4 Stage-3 accommodates scaling the system resources by managing the number of analysis nodes based on available resources and defined constraints.
2.5 Stage-4: Results Output to ADW
    2.5.1 move data out of HDFS and back into the relational ADW in order to re-contextualize it and prepare it for user presentation
    2.5.2 Each parent-child relationship and the highest confidence value found is inserted into the relational database.
2.6 Stage-5: ADW summarization& User Presentation
    2.6.1 Align produced data from previous stages with the needs of the user interface
    2.6.2 Data is summarized and processed to provide summary statistics to the user through a defined user workflow in the application.
    2.6.3 Data is then sourced from the analytics data warehouse and presented in a web-based application in map and table/chart forms
    2.6.4 Requirements here drive stage-5 data summarization.

Figure 3:
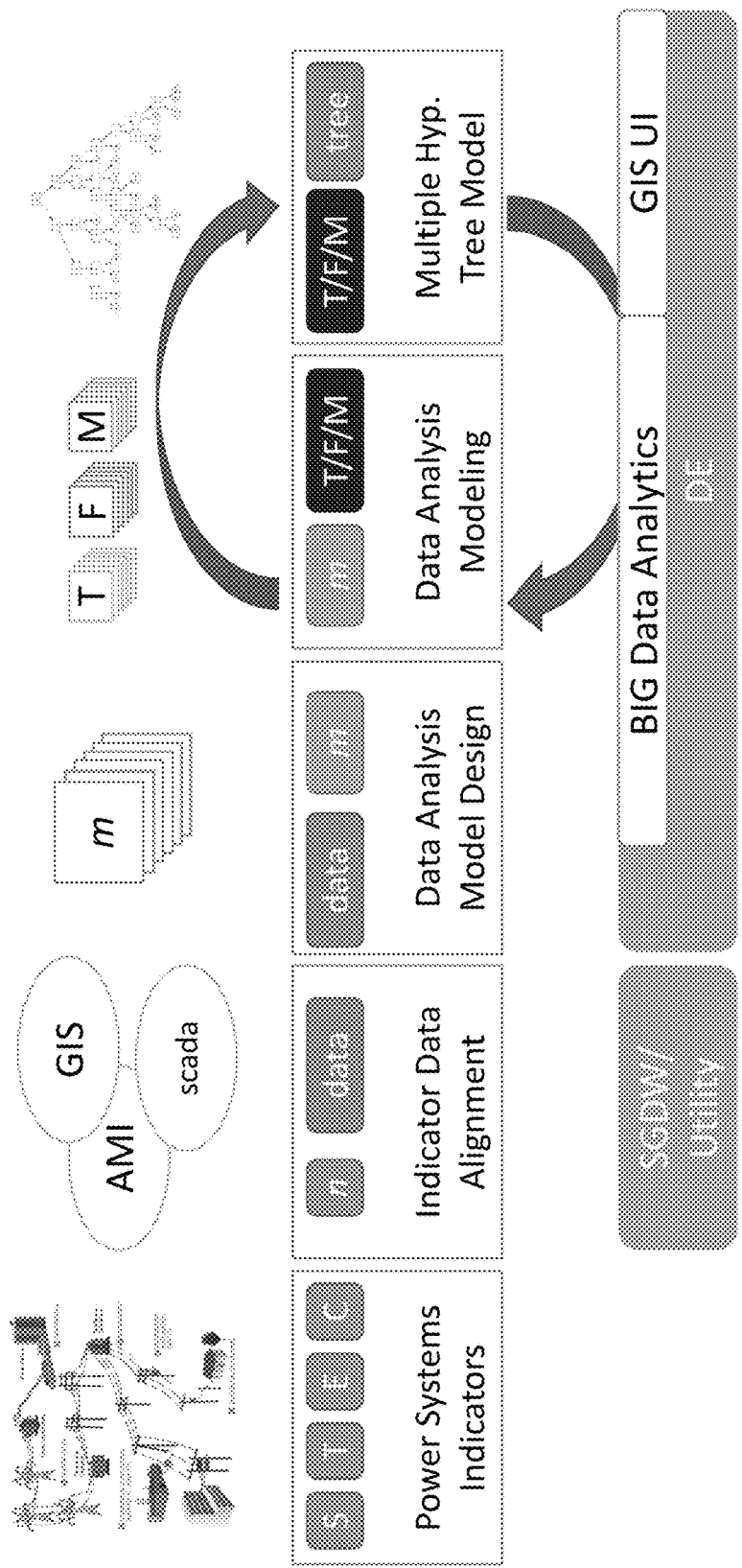
FIG. 3 provides a schematic of the overall solution process in accordance with the embodiments described herein.
Figure 4:
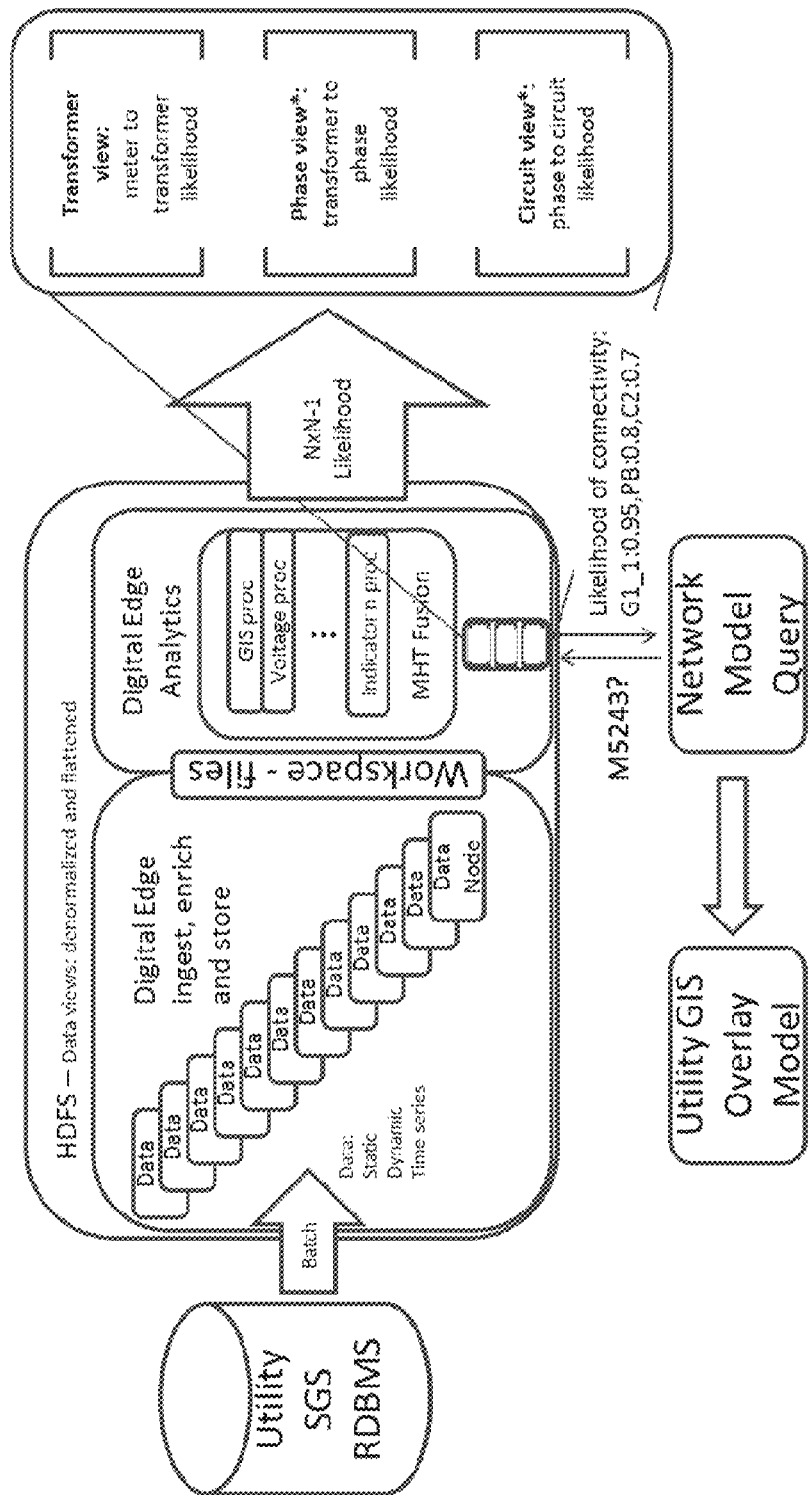
FIG. 4 provides an additional detailed schematic of the Business and Operational Process steps of the overall solution in accordance with the embodiments described herein.

FIGS. 3-4 provide more detailed schematics of the Business and Operational Process steps identified above at 1.1, 1.2, 1.3 and 1.4. The reference characters are assigned meanings as follows:

TABLE 1

| Reference Character | Meaning |
|---|---|
| S | Spatial |
| T | Time Series |
| E | Event (e.g., outage, restoration) |
| C | Contextual |
| n | data |
| m | meter |
| T | True |
| F | False |
| M | Maybe |

Step 1—Customer GIS Data Loaded (1.1) (Stages 0 to 1)

Figure 7:
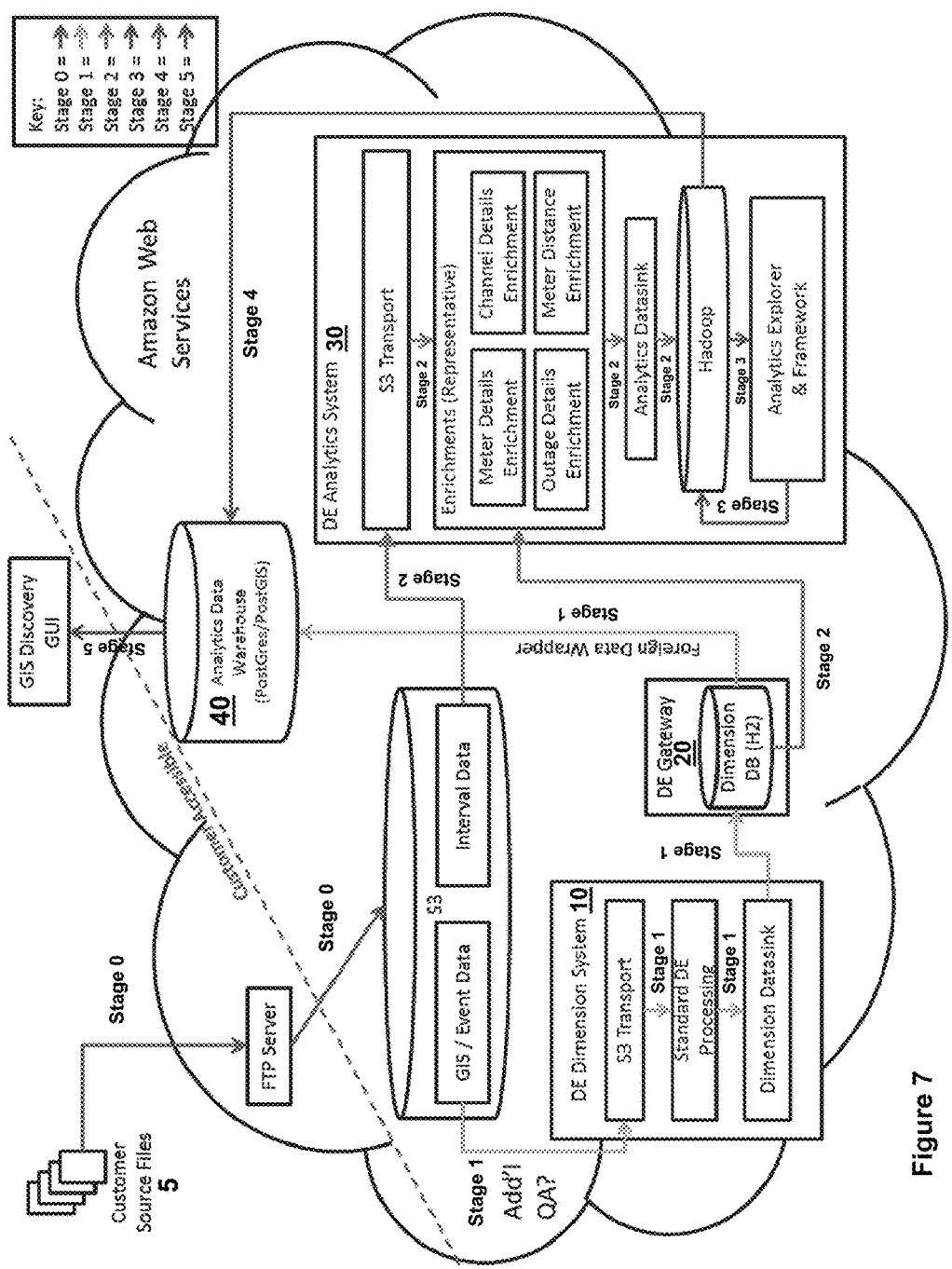
FIG. 7 provides summary flow diagrams for the end-to-end GIS discovery process in accordance with the embodiments described herein.

Referring to FIG. 7, during this step, the customer's GIS/Event data is loaded into the Engineering (Analytics) Data Warehouse ("ADW") 40 using, for example, the process described in co-owned U.S. Pat. No. 9,092,502 entitled "System and Method For Correlating Cloud-Based Big Data in Real-Time For Intelligent Analytics and Multiple End Uses" (hereafter referred to as "Digital Edge" or "DE"), the contents of which is incorporate herein by reference in its entirety and considered to be part of the present application. The DE platform uses high speed ingest capability to integrate ETL (extract, transform, and load), real-time processing, and "big data" data stores, into a high performance analytic system. The DE platform provides the capability of normalizing and correlating to external data sets. The DE platform as shown in FIG. 7 includes a DE Dimension System 10, a DE Gateway 20 and a DE Analytics System 30.

In the present embodiments, source files (i.e., input stream) 5 are loaded into a first data base S3 in accordance with GIS/event data and interval data. In a preferred embodiment, dimensional data from dimension records may be correlated with the input stream at the DE Dimension System 10, e.g., through a key matching strategy, and stored in the dimension database H2 of the DE Gateway, 20 and in the Engineering (Analytics) Data Warehouse 40.

Running in a virtualized environment, the DE platform is designed to scale to meet virtually any load, and can do so automatically. When DE runs in a public or private cloud environment, it dynamically provisions compute, storage, and network resources to run the configured system. There are two aspects to this. First, is the simplification of running a system itself. In a traditional environment, you must decide physically where everything runs, which server, what storage, etc., and be sure to set things up that way. However, when running in a cloud environment, DE automatically starts virtual machines, allocates and attaches virtual storage, and establishes the network parameters so the system operates correctly. DE does this automatically; it just requires a private or public cloud infrastructure underneath. In addition, DE allows for configuration of the system so that it monitors processing load, and adds or removes resources as load changes. For example, you can configure the system such that it maintains the throughput rate required to maintain the data flow rate sent by input sources. You can also configure it to add storage when required. This means that if load spikes occur, the system can respond without human intervention.

The DE platform supports shared, reusable components. Plug-ins are written in Java and add functionality to the platform. There are five types of plug-ins: Transports which facilitate transferring source data into the system; Parsers for converting a specific data format into name/value pairs (e.g., CSV, XML, JSON, JPEG, etc.); data Models specifying how the data looks, how it is enriched, how input is mapped to it, and how dimensions are used to enrich the data; Enrichments for adding context and meaning to the incoming data by enhancing the raw data with dimension data and Data Sinks which consume the final, enriched record for some purpose. Generally speaking, this usually means storing or indexing the data, but a data sink can perform other functions, such as alert filtering. Several data sinks can be used in parallel supporting different NoSQL stores. Currently, components are public or private. A public component is available to all and can be reused. A private component only applies to the current tenant. DE facilitates development of a set of components for a particular purpose or vertical market, and to permit sharing of components among peers. For example, a set of standard components can be developed specifically for the GIS market. This standard set can then be extended to add additional functionality.

The DE Analytics System 30 performs real-time data enrichment and correlation. Enrichment is the process of adding meaningful information to a data feed before it is stored or alerted upon. This is particularly effective when using the "NoSQL" databases given that these data stores do not support joins. One way DE handles dimension tables is to "pre-join" the input feed to dimensions at ingest time; merging data at ingest. Accordingly, when the record is queried, no joins are required—the relevant data is already in the record. Data that comes from dimension tables is one kind of enrichment. In addition to this "pre-joining" technique, DE also provides generalized, algorithmic "enrichment." For example, an algorithm that converts a latitude/longitude pair to a grid reference, is an example of an enrichment.

The DE solution supports a multi-tenant architecture. Not to be confused with a multi-instance implementation with distinct instances of the software, multi-tenant applications run a single instance of the software, serving multiple entities (tenants). Multi-tenancy enables virtual partitioning of all the elements of DE and data for each tenant organization. Each tenant utilizes a customized virtual application instance.

At this initial data loading stage, all probability fields are null which indicates that the analytical processes have not been run on the data. Once loaded, the data can be manually inspected in the GIS application which will show the "as-loaded" view of the data. In a particular example, the data load process loads flat file exports from the utilities which may include, but is not limited to:

Distribution network export—The distribution network export may be provided in Multispeak format as described in the National Institute of Standards and Technology (NIST) Standards Framework and Roadmap specification. This will be an XML representation of the utilities network or power system model. It will include details about each distribution network node including geolocation as well as the relationships between these objects.

Voltage Channel Data—Interval data for the voltage channel of the metering endpoints.

Outage Events—This file will contain all momentary and sustained outage events available from the metering endpoints. This data may be received from an OMS which accepts detected outage information from, e.g., customer telephone calls, as well as from automated outage detection systems such as an advanced metering infrastructure ("AMI") system or an interactive voice response system. An AMI system manages communications with meters, typically at customer locations and may manage customer loads or to connect/disconnect/reconnect customer services.

SCADA (supervisory control and data acquisition) Voltage Data—Any voltage interval data available in the utility's SCADA system.

Other Operational data—Including metered data from AMI or system operations data from distribution SCADA (which control and obtain data about distribution substation equipment) or distribution automation systems (similar to distribution SCADA but these DA systems control or obtain data from devices down line of the distribution substation).

Step 2—Data Export and Enrichment (Stage 1 to Stage 2)

Figure 8:
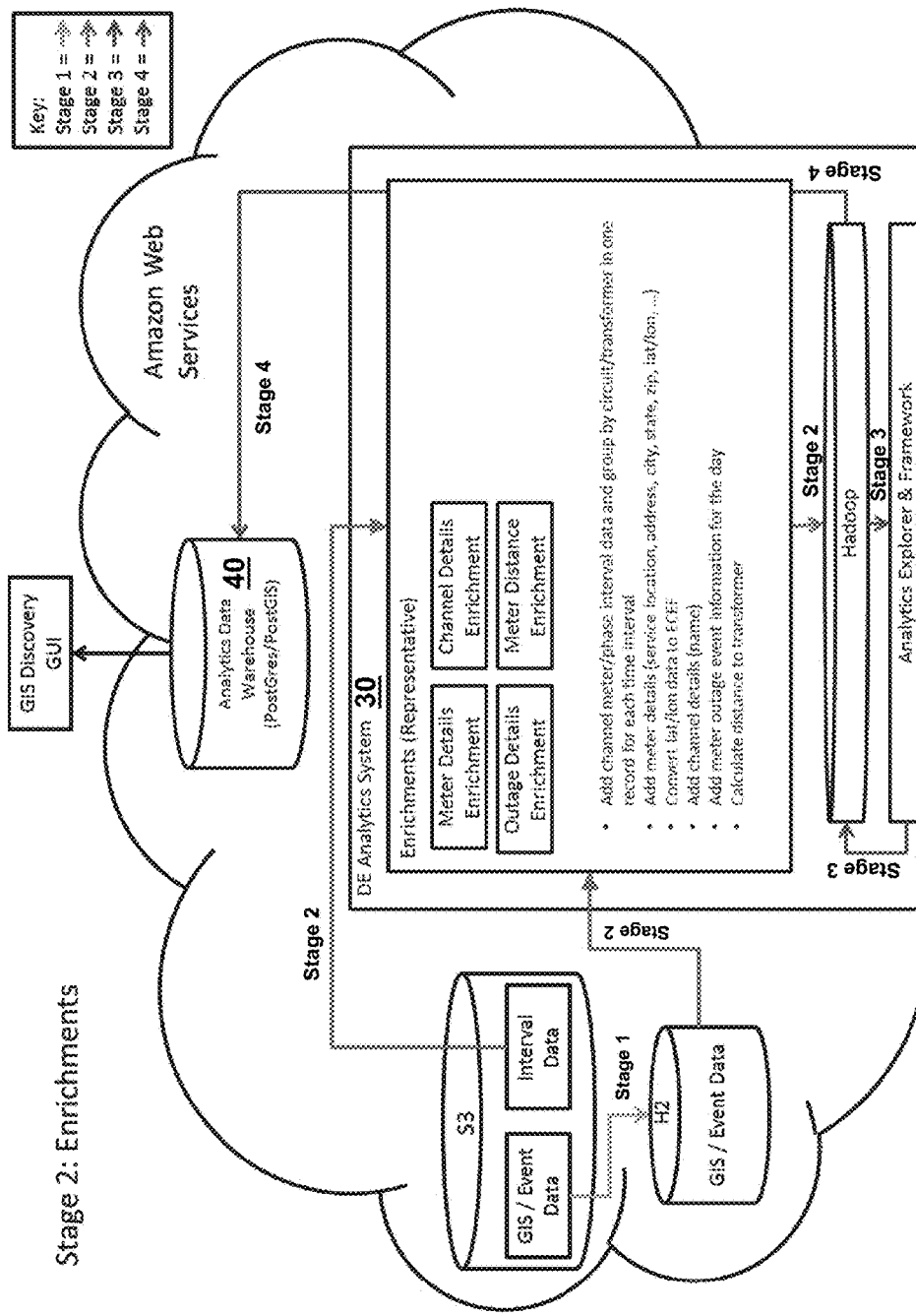
FIG. 8 provides enrichment flow diagrams for the end-to-end GIS discovery process in accordance with the embodiments described herein.

Referring to FIG. 8 from the DE Gateway 20, the dimension GIS/event data is then exported to the DE Analytics System 30, enriched and stored in, for example, Hadoop (HDFS) for analytical processing in accordance with DE processing described above. With respect to Step 2, Table 2 below exemplifies the exported data that describes the meter relationships for inputting to the analytical processing. These steps take the input data from Stage 0 and perform numerous pre-analytics processing, preparation and enrichment including data separation, concatenation, and staging. The meter data is subjected to broad or rough filtering in advance of the sophisticated analytics in latter stages in order to provide an initial score with respect to "null" values for transformer, circuit and phase from customer provided data and to provide a rough initial score, i.e., probability, for possible alternate transformers, circuits, phase with respect to specific meters. As shown in FIG. 8, types of enrichments may include, but are not limited to meter details enrichment, channel details enrichment, outage details enrichment and meter distance enrichment. More specifically, enrichments may: add channel meter/phase interval data and group by circuit/transformer in a single record for each time interval, add meter details including but not limited to service location, address, city, state, zip code, latitude and longitude coordinates; convert latitude and longitude coordinate data to ECEF; add channel details (e.g., name); add meter outage event information for a predetermined period of time (e.g., day); calculate distance to transformer. The exemplary enrichments listed herein are not intended to be limiting. One skilled in the art recognizes the additional enrichments that may be available and useful for enriching the GIS data for analysis.

TABLE 2

| Field | Description |
| --- | --- |
| Meter ID | Unique identifier of the meter |
| Supplied Transformer Score | The probability that the meter is associated with the transformer identified in the customer provided data |
| Supplied Phase Score | The probability that the meter is associated with the phase identified in the customer provided data |
| Supplied Circuit Score | The probability that the meter is associated with the circuit identified in the customer provided data |
| Alternate Transformer ID | ID of the transformer identified as an alternative connection |
| Alternate Transformer Score | The probability that the meter is associated with the alternate transformer identified by analytical processing |
| Alternate Phase ID | ID of the phase identified as an alternative connection |
| Alternate Phase Score | The probability that the meter is associated with the alternate phase identified by analytical processing |
| Alternate Circuit ID | ID of the circuit identified as an alternative connection |
| Alternate Circuit Score | The probability that the meter is associated with the alternate circuit identified by analytical processing |
| Individual MHT Scores for Supplied Relationship | Individual scores elements for each of the MHT node processes. |
| Individual MHT Scores for Alternate Relationship | Individual scores elements for each of the MHT node processes. |

Step 3—Analytical Processing (Stage 3)

Within the DE Analytics System 30, at the core of the analytical processing is a Multi-Hypothesis Tracking (MHT) process to determine the validity of the data and define alternate relationships between the network elements indicated by the data patterns. The processing steps are described in section 2.4 herein and in FIG. 9. MHT processes are described in "Multiple Hypothesis Testing," Annual Review of Psychology: 1995; 46, Health & Medical Complete, pages 561-584 and "Multiple Hypothesis Tracking for Multiple Target Tracking," IEEE A&E Systems Magazine, Vol. 19, No. 1, January 2004, pages 5-18 which are incorporated by reference herein in their entireties. The MHT processes may be implemented using tools developed as part of the Assignee's Scale2Insight (S2i) analytic toolkit originally developed as a platform for execution and automation of these kinds of high-scale, high-complexity, highly-parallel computational analyses. S2i provides a platform for the implementation, execution, and procedural workflow associated with analyses such as MHT.

Step 4—Result Loading (Stages 4 & 5)

The results of the analytical processes are parsed and loaded into the Engineering Data Warehouse tables. During the process, the probability column of the network adjacency table is populated with the probability that the supplied relationship is correct. If the analytical process identified the possibility of an alternative relationship, an additional relationship will be added to the network adjacency table and flagged as alternate. The existence of two relationships for a single meter indicates the potential for a correction and the map will display the relationship as such.

An appropriate user-friendly interface allows a user, i.e., utility company/customer, to view not only the distribution network model they provided as part of Step 1, but also any inaccuracies identified by the analytics algorithms during processing (Step 3). As depicted in the screen mock up shown in FIG. 5a (map generated using, for example, ESRI's ArcGIS product), the user will have the ability to enter a probability threshold (shown as "50%") and any relationships that have an alternate relationship returned by the analytics engine with a probability greater than the threshold will be displayed as "Suspected Error" and "Recommended Correction". And by clicking on a component the user will be able to see the data resulting from the analytics process that drove the decision. Accordingly, for the example shown in FIG. 5a, by clicking on the "Recommended Correction" segment, the user can see that for meter 12345, the "null" or original GIS data for the Phase and Circuit is True or correct with the % readings of correctness of 99% and 78%, respectively, while the "null" Transformer data is determined to be False with a % of 88%. Accordingly, a different Transformer is recommended. Further, the user can view additional data and percentages which support the True/False/Maybe determinations. So, as shown, percentages for Voltage Alignment (75%), GeoLocation (100%) and Outage Alignment (65%) are provided in support of the determination that the "null" for Phase for Meter 12345 is True with 99% accuracy.

FIGS. 5b and 5c provide additional output views to the user showing the results of the analytics processing for a selected Station (substation): Station-1 and Transmission Load Area (TLA): TLA1. More particularly, FIG. 5b shows the TLA-1 mapping post-analytics for transformers and meters for Station-1. The higher the correctness indicator % (CI), the more uncertainty there will be as the system will be less certain about fewer things. And FIG. 5c overlays the mapping on a geographical mapping of the area.

Figure 6:
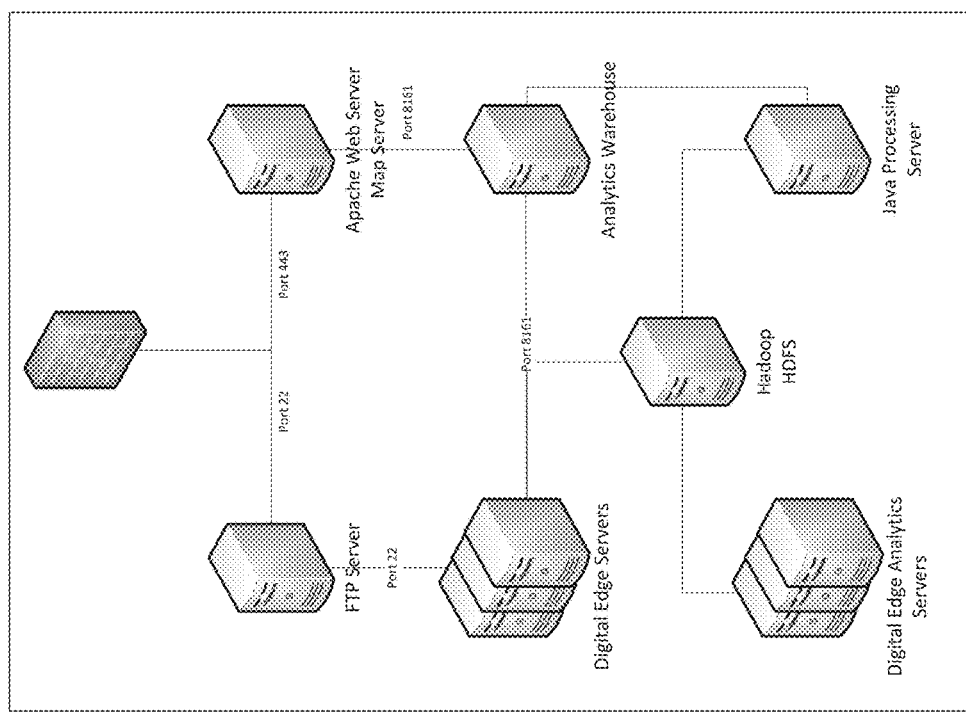
FIG. 6 provides an exemplary hardware component architecture for implementing the embodiments described herein.
Figure 9:
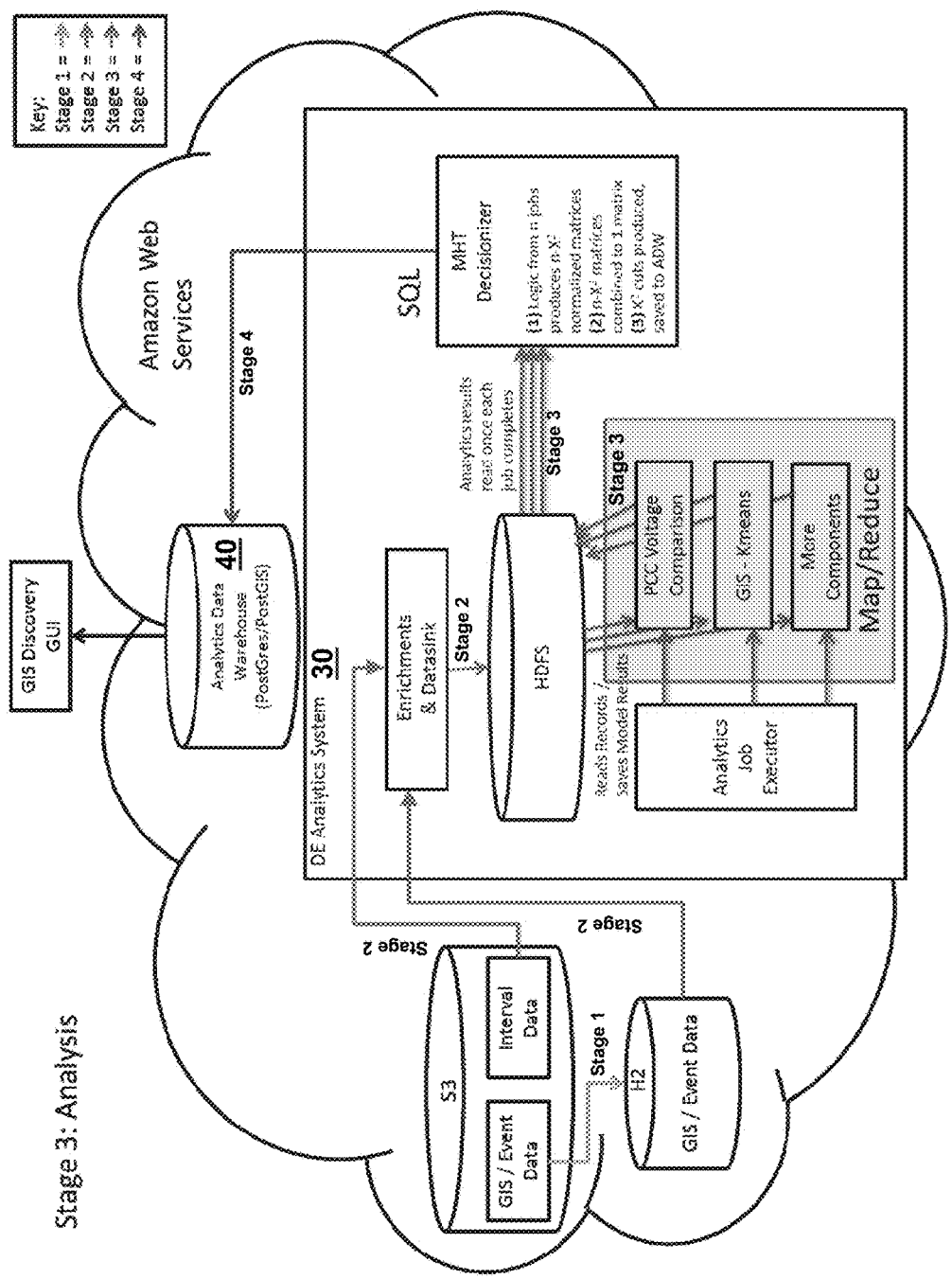
FIG. 9 provides analysis flow diagrams for the end-to-end GIS discovery process in accordance with the embodiments described herein.

An exemplary system architecture and configuration for implementing Steps 1-4 and Stages 0 through 5 from the 2.0 GIS Discovery Analytical Process are depicted in greater detail with respect to FIGS. 6 through 9. More particularly, FIG. 6 provides an exemplary hardware component architecture for implementing the embodiments described herein. FIGS. 7 to 9 provide summary (FIG. 7), enrichment (FIG. 8) and analysis (FIG. 9) flow diagrams for the end-to-end GIS discovery process with corresponding Stages 0-5 identified.

One skilled in the art recognizes that variations in the architecture and configuration may be made without affecting the functionality. Such variations are intended to be within the scope of the embodiments.

The invention claimed is:

1. A process for assessing the correctness of utility component mapping relationships and updating a mapping as needed comprising:

receiving at a first server a first data set indicative of a first mapping of grid components for a predetermined geographical area, the first data set being from a first source;

enriching by an enrichment component running on a server the first data set to include additional details related to the grid components within the predetermined geographical area to produce a second data set indicative of a second mapping of the grid components for the predetermine geographical area, the additional details being from one or more additional sources;

analyzing by an analytical component running on a server the first mapping of grid components and the second mapping of grid components for the predetermined geographical area to determine a validity of each individual mapping between two or more grid components in the first mapping and storing results of the determined validity in at least one storage component; and providing by an output component with access to the at least one storage component an indicator of the determined validity of each individual mapping between two or more grid components in the first mapping;

presenting by the analytical component an alternative mapping to an individual mapping when a determined validity of the individual mapping is low and assigning a probability threshold to the alternative mapping, the probability threshold being an indicator of the likelihood that the alternative mapping is accurate over the individual mapping;

receiving a selected probability threshold, wherein when a probability threshold for an alternative mapping is above the selected probability threshold, the individual mapping is identified as a suspected error; and replacing the individual mapping with the alternative mapping for the predetermined geographical area when the individual mapping is identified as suspected error.

2. The process of claim 1, wherein the grid components include meters and transformers within the predetermined geographical area.

3. The process of claim 2, wherein the predetermined geographical area is determined in accordance with a location of at least one substation.

4. The process of claim 2, wherein the first data set includes individual mappings between meters, transformers, circuits and phases.

5. The process of claim 4, wherein the first data set further includes phase data associated with each individual meter and transformer mapping.

6. The process of claim 2, wherein the additional details related to the grid components are selected from the group consisting of: data related to one or more specific meters identified in the first data set; data related to one or more additional meters not identified in the first data set; data related to event details for one or more grid components identified in the first data set.

7. The process of claim 1, wherein the analytical component applies one or more analytical methods selected from the group consisting of Point of Common Control (PCC) voltage comparison and Kmeans.

8. The process of claim 7, wherein the analytical component applies a Multi-Hypothesis Tracking (MHT) process to determine validity of the individual mapping and present alternative mappings.

9. The process of claim 1, wherein each individual mapping between two or more grid components includes one of the following mappings: meter-to-transformer; transformer-to-phase; meter-to-phase; meter-to-circuit and transformer-to-circuit.

10. A system for assessing the correctness of utility component mapping relationships and updating a mapping as needed comprising:

a first subsystem including at least a first database for receiving a first data set indicative of a first mapping of grid components for a predetermined geographical area, the first data set being from a first source;

the first subsystem further including an enrichment component running on a processor for enriching the first data set to include additional details related to the grid components within the predetermined geographical area to produce a second data set indicative of a second mapping of the grid components for the predetermine geographical area, the additional details being from one or more additional sources and a second database for storing the second data set;

a second subsystem including an analytical component running on a processor for analyzing the first mapping of grid components and the second mapping of grid components for the predetermined geographical area to determine a validity of each individual mapping between two or more grid components in the first mapping and storing results of the determined validity in at least one storage component;

an output component with access to the at least one storage component for providing an indicator of the determined validity of each individual mapping between two or more grid components in the first mapping, wherein the analytical component of the second subsystem presents an alternative mapping to an individual mapping when a determined validity of the individual mapping is low and assigns a probability threshold to the alternative mapping, the probability threshold being an indicator of the likelihood that the alternative mapping is accurate over the individual mapping;

receives a selected probability threshold, wherein when a probability threshold for an alternative mapping is above the selected probability threshold, the analytical component identifies the individual mapping as a suspected error; and replaces the individual mapping with the alternative mapping for the predetermined geographical area when the individual mapping is identified as suspected error.

11. The system of claim 10, wherein the grid components include meters and transformers within the predetermined geographical area.

12. The system of claim 11, wherein the predetermined geographical area is determined in accordance with a location of at least one substation.

13. The system of claim 11, wherein the first data set includes individual mappings between meters, transformers, circuits and phases.

14. The system of claim 13, wherein the first data set further includes phase data associated with each individual meter and transformer mapping.

15. The system of claim 11, wherein the additional details related to the grid components are selected from the group consisting of: data related to one or more specific meters identified in the first data set; data related to one or more additional meters not identified in the first data set; data related to event details for one or more grid components identified in the first data set.

16. The system of claim 10, wherein the analytical component applies one or more analytical methods selected from the group consisting of Point of Common Control (PCC) voltage comparison and Kmeans.

17. The system of claim 16, wherein the analytical component applies a Multi-Hypothesis Tracking (MHT) process to determine validity of the individual mapping and present alternative mappings.

18. The system of claim 10, wherein each individual mapping between two or more grid components includes one of the following mappings: meter-to-transformer; transformer-to-phase; meter-to-phase; meter-to-circuit and transformer-to-circuit.

\* \* \* \* \*